Aug. 12, 1952     G. G. HERRICK     2,606,955
ELECTRICAL CONDENSER

Filed Feb. 3, 1949     2 SHEETS—SHEET 1

INVENTOR.
GEORGE GRANT HERRICK
BY
ATTORNEYS

INVENTOR.
GEORGE GRANT HERRICK

Patented Aug. 12, 1952

2,606,955

UNITED STATES PATENT OFFICE 2,606,955

ELECTRICAL CONDENSER

George Grant Herrick, Benzinger Township, Elk County, Pa., assignor to Jeffers Electronics, Inc., Dubois, Pa., a corporation of Pennsylvania Application February 3, 1949, Serial No. 74,287

4 Claims. (Cl. 175—41)

This invention relates to condensers of small size such as are used in high frequency apparatus and to methods of making the same.

In high frequency apparatus such as television and radar and similar apparatus it is desirable to provide small condensers which have relatively high capacities for their sizes, these being used for bypass, filtering and other purposes. Heretofore such condensers have been provided in the form of ceramic discs or plates faced with deposited silver with which leads make electrical contact, the deposited silver forming the plates of the condenser.

One object of the present invention is the provision of a condenser of generally similar type but which is more easily and less expensively formed. In brief, the improved condenser comprises a ceramic dielectric member, which is first coated with chromium and then the chromium is copper coated, with leads soldered to the coatings, the structure then being desirably insulated. A further object of the invention relates to the steps in the manufacture of such condensers.

These and other objects of the invention particularly relating to details of construction and operation will become apparent from the following description read in conjunction with the accompanying drawing in which.

Figures 1, 2:
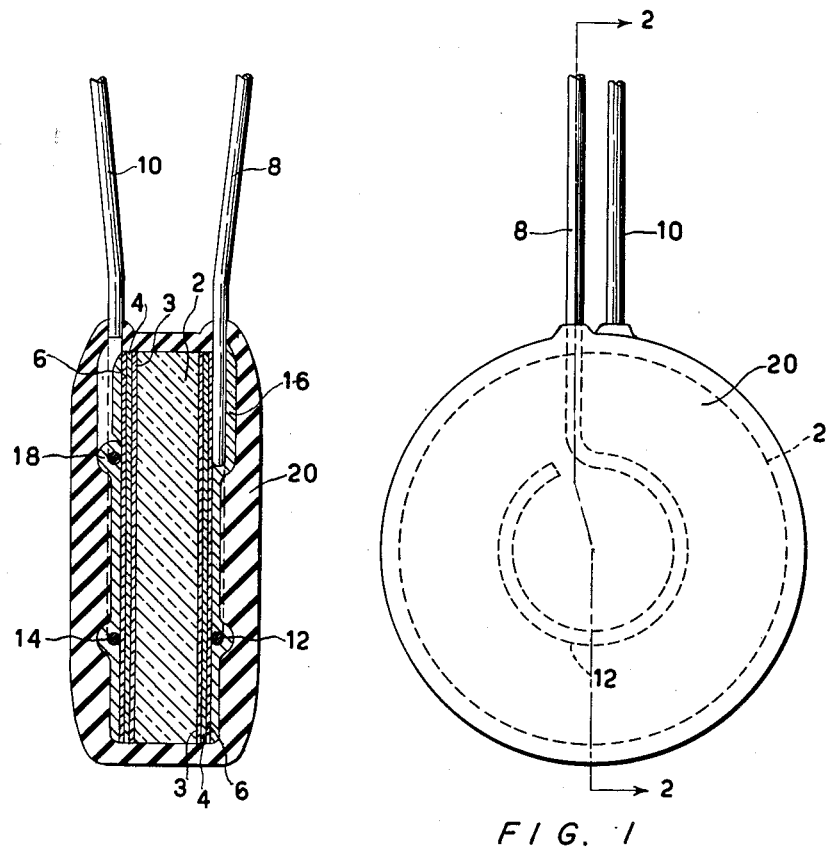
Figure 1 is a side elevation of a condenser provided in accordance with the invention.
Figure 2 is an axial section taken on the plane indicated by 2—2 in Figure 1, the thicknesses of the coatings being exaggerated for clarity.

Referring to Figures 1 and 2 the condenser comprises as its dielectric a ceramic, glass or other dielectric disc 2 preferably formed of one of the well known high dielectric ceramics. This ceramic disc may be formed in any desired fashion, for example, in a pill machine or by extrusion of the plastic ceramic material followed by the cutting off of an extruded rod, or by the stamping of the ceramic material into the discs. The formed discs are fired in the usual fashion at high temperature to provide the final form of the disc.

The disc 2 is then placed in a chamber from which the air is evacuated to a pressure generally less than $2 \times 10^{-4}$ mm. Hg. Also within the chamber are placed quantities of chromium and copper, these metals being contained in separate cups of tungsten or the like, there being a number of each type of cup. After the vacuum has been established the temperature of the tungsten cup is raised to that at which vaporization of the chromium will take place.

After a period of about three minutes of vaporization a layer of chromium has been deposited on the disc forming a uniform coating 3. Then the cup containing the copper is heated to a temperature sufficient to vaporize the copper and a mixture of copper and chromium is deposited for approximately two minutes forming the coating 4. The cup containing chromium is then allowed to cool and copper alone is vaporized and deposited for a period of approximately three minutes forming the coating 6. Following these coating operations the cup containing copper is allowed to cool, the vacuum is destroyed, the container opened, and the ceramic disc removed.

In the metal vaporization process the vapor travels in a straight line from the source of vapor to the surface on which the vapor is to be deposited. Therefore, to obtain an insulating boundary between the capacitor electrodes it is only necessary that the ceramic be placed behind a suitable mask or shield during the vaporization process. Such a boundary may exist on the periphery of the disc effecting a separation between opposite sides of the disc or may be on one side of the disc effecting a separation between portions of the coating on one side of the disc as will be hereinafter described. If both sides of the disc are to be coated, the cups of metal are suitably disposed relatively to the discs.

It has been found that a vapor coating of chromium will adhere to the ceramic disc with greater tenacity than a vapor coating of copper. It has also been found that the copper coating does not adhere well when applied directly over the chromium coating. However, a mixture of copper and chromium will adhere well to the chromium coating and will also provide a suitable surface to which the copper coating will adhere. Therefore, the ceramic is preferably coated first with chromium, then with a mixture of chromium and copper and finally with copper alone. While other metals may be used which would provide both a suitable bond with the dielectric material and a suitable high conductivity coating, it has been found that among the most desirable combinations is the combination of chromium and copper applied in the manner described, thus producing a metal coating which has both tenacity in its adherence and high conductivity of its surface.

This method of providing a continuous coating of copper to the ceramic disc is both rapid and inexpensive and eliminates the necessity for the use of more expensive metals such as silver or other high conductivity alloys. However, in carrying out this process it is of the utmost importance that absolute cleanliness be observed in connection with all parts and materials employed in the high vacuum vapor plating, that the metal used for plating be generally of highest purity and that during the plating operation the high vacuum as hereinbefore indicated must be maintained.

There is then associated with the disc a pair of lead wires 8 and 10 provided with loops 12 and 14 which are adapted to engage flatwise the copper coatings on the flat surfaces of the disc. This association may be effected by holding the lead wires 8 and 10 in clamping means so that they are sprung against the copper coatings and support the coated disc. The disc and the looped ends of the lead wires, which are preferably of tinned copper, are then dipped into a bath of solder and removed with the result that the solder will adhere to the copper coatings and to the wires to bond them together. This solder is indicated at 16 and 18. The solder serves another purpose besides merely bonding the lead wires to the copper surfaces. It will fill the pores of the deposited copper and add thickness to the conductive portion of the coating thus greatly increasing the conductivity of the coating so that highly conductive plates are provided for the condenser. The solder will not adhere to the exposed peripheral surfaces of the ceramic disc so that there is avoided any shorting between the opposed plates of the condenser.

The structure thus provided need not be insulated but preferably insulation is effected either by dipping the assembly in paint or by compressing over it a resin such as a phenol-formaldehyde resin followed by later baking so as to provide an insulated coating indicated at 20, from which coating the lead wires 8 and 10 extend.

The finished condenser formed as just stated has a quite high capacity for its physical dimensions. For example, using a high dielectric ceramic disc ⅜ inch in diameter and having a thickness of 0.070 inch there may be secured a condenser having a capacity of 1500 micromicrofarads. The condenser thus provided also exhibits a very high leakage resistance of the order, for example, of 60,000 megohms. The condenser is also capable of withstanding high voltages up to the point of sparking between the lead wires.

As has been hereinbefore stated a capacitor may be formed with a coating on only one surface, said coating being divided by an insulating area to form two electrodes. This gives a low capacity but is done when the low capacity is desirable because of the ease in controlling the capacity value.

Figure 3:
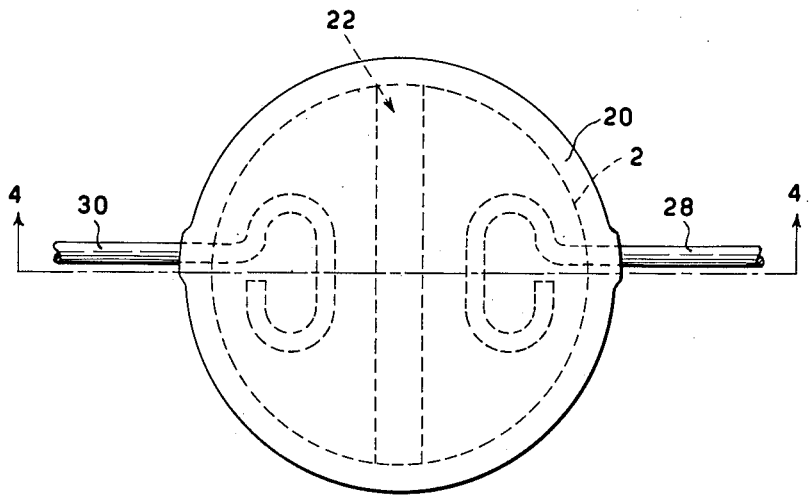
Figure 3 is a side elevation of an alternate form of a condenser provided in accordance with the invention.
Figure 4:
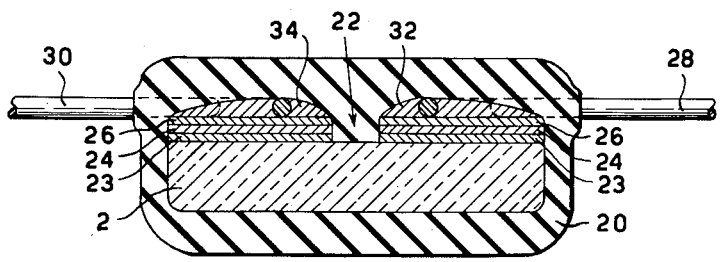
Figure 4 is an axial section of the alternate form of the condenser taken on the plane indicated by 4—4 in Figure 3, the thicknesses of the coatings being here also exaggerated.

Figures 3 and 4 show such a capacitor arrangement. The ceramic disc 2 is coated on one face only by the successive layers of chromium 23, copper and chromium 24, and copper alone 26, similar to the coatings applied in the capacitor shown in Figure 2. However, during the vapor coating operation a portion of the surface of the disk was masked providing an insulating space 22 between the coated surfaces. The lead wires 28 and 30 are soldered as indicated at 32 and 34 and the entire assembly is covered with a plastic coating 20.

It will be noted that the leads extend generally radially outward from the two portions of the coated surface so as to avoid capacitance effect between each other.

In accordance with the invention an improved condenser can be provided in simple fashion without the necessity for silver deposition which is costly and relatively difficult to carry out. It will be evident that the invention may be embodied in various other forms without departing from its scope as defined in the following claims.

What I claim and desire to protect by Letters Patent is:

1. An electrical condenser comprising a member of dielectric material and coatings of metal on said member, each of said coatings including a layer of chromium adjacent to said member, a layer of a mixture of chromium and copper covering said layer of chromium, and an outer layer of copper covering the chromium copper layer, said coatings being spaced from each other to provide plates of the condenser.

2. An electrical condenser comprising a member of dielectric material and coatings of metal on said member, each of said coatings including a layer of chromium adjacent to said member, a layer of a mixture of chromium and copper covering said layer of chromium, an outer layer of copper covering the chromium copper layer, said coating being spaced from each other to provide plates of the condenser, and a lead wire soldered to each of the layers of copper.

3. An electrical condenser comprising a member of dielectric material and coatings of metal on each of opposed surfaces of said member, each of said coatings including a layer of chromium adjacent to said member, a layer of a mixture of chromium and copper covering said layer of chromium, an outer layer of copper covering the chromium copper layer, said coatings being spaced from each other to provide plates of the condenser, and a lead wire soldered to each of the layers of copper.

4. An electrical condenser comprising a member of dielectric material and coatings of metal on one face of said member, each of said coatings including a layer of chromium adjacent to said member, a layer of a mixture of chromium and copper covering said layer of chromium, an outer layer of copper covering the chromium copper layer, said coatings being spaced from each other to provide plates of the condenser, and a lead wire soldered to each of the layers of copper.

GEORGE GRANT HERRICK.

REFERENCES CITED

The following references are of record in the file of this patent:

UNITED STATES PATENTS

| Number | Name | Date |
|---|---|---|
| 893,811 | Pickard | July 21, 1908 |
| 1,479,315 | Pickard | Jan. 1, 1924 |
| 1,576,436 | Gustin | Mar. 9, 1926 |
| 1,926,842 | Dubilier | Sept. 12, 1933 |
| 2,398,176 | Deyrup | Apr. 9, 1946 |
| 2,408,910 | Burnham | Oct. 8, 1946 |
| 2,410,733 | Hewlett | Nov. 5, 1946 |
| 2,497,666 | Gravley | Feb. 14, 1950 |

OTHER REFERENCES

Morgan abstract of application Serial Number 515,343, published October 25, 1949; 627 O. G. 1222.